United States Patent
Owen et al.

(10) Patent No.: US 11,630,676 B2
(45) Date of Patent: Apr. 18, 2023

(54) SYSTEMS AND COMPUTER IMPLEMENTED METHODS FOR INTEGRATING SOFTWARE PLATFORMS

(71) Applicants: Atlassian Pty Ltd., Sydney (AU); Atlassian Inc., San Francisco, CA (US)

(72) Inventors: Christopher Owen, Sydney (AU); Andrew Vernon, Sydney (AU); Michael Johannes Ruflin, Sydney (AU); Jeremey Barrett, Sydney (AU); Halit Okumuş, Ankara (TR); Metin Takak, Ankara (TR); Ümit Ulusoy, Ankara (TR)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/363,606

(22) Filed: Jun. 30, 2021

(65) Prior Publication Data

US 2023/0004401 A1    Jan. 5, 2023

(51) Int. Cl.
| | |
|---|---|
| *G06F 9/445* | (2018.01) |
| *G06F 3/0484* | (2022.01) |
| *G06F 9/451* | (2018.01) |
| *G06F 16/245* | (2019.01) |
| *G06F 3/0482* | (2013.01) |

(52) U.S. Cl.
CPC ........ *G06F 9/44505* (2013.01); *G06F 3/0484* (2013.01); *G06F 9/451* (2018.02); *G06F 16/245* (2019.01); *G06F 3/0482* (2013.01)

(58) Field of Classification Search
CPC .... G06F 9/44505; G06F 3/0484; G06F 9/451; G06F 16/245; G06F 3/0482
See application file for complete search history.

(56) References Cited

U.S. PATENT DOCUMENTS

| | | | |
|---|---|---|---|
| 2014/0181145 A1* | 6/2014 | Kamsamohideen | ........................ G06F 11/0793 707/776 |
| 2016/0350139 A1* | 12/2016 | Gandhi | ..................... G06F 8/61 |
| 2018/0189344 A1* | 7/2018 | Akwule | ................ G06F 16/951 |
| 2020/0241944 A1* | 7/2020 | Derdak | ................... G06F 9/547 |
| 2020/0346783 A1* | 11/2020 | Conaway | ............ G06F 16/9024 |
| 2021/0365356 A1* | 11/2021 | Mukhopadhyay | .. G06F 11/3688 |

* cited by examiner

*Primary Examiner* — Jennifer N Welch
*Assistant Examiner* — Kc Chen
(74) *Attorney, Agent, or Firm* — Brownstein Hyatt Farber Schreck, LLP (57) ABSTRACT

Described herein is a computer implemented method for confirming the completion of an onboarding setup item of an IT Service Management (ITSM) system. The system comprises a first software platform, a second software platform and an intermediary onboarding platform operatively associated with a database for storing a state of the setup item, the setup item being associated with at least one of the first and second software platforms. The method comprises receiving input data associated with at least one of the first and second software platforms; querying the received input data against completion criteria that is dependent on a predetermined item type; updating a state of the setup item; and displaying a visual indication of confirmation of the completion of the setup item.

17 Claims, 6 Drawing Sheets

SYSTEMS AND COMPUTER IMPLEMENTED METHODS FOR INTEGRATING SOFTWARE PLATFORMS

FIELD

Aspects of the present disclosure are directed to integration of software platforms, and in particular to integration of the onboarding processes associated with the integration of software platforms.

BACKGROUND

Background information described in this specification is background information known to the inventors. Reference to this information as background information is not an acknowledgment or suggestion that this background information is prior art or is common general knowledge to a person of ordinary skill in the art.

Software development is a complex process which can involve the use of multiple different tools and systems. Pieces of software may be developed from scratch, that is, a programmer can write brand new software code. Such development, whilst potentially being very time consuming and laborious, also has the potential benefit of avoiding any technical or functional constraints of an existing system. The addition of new features to software platforms may also be achieved by integrating one existing software product into another existing software product, that is, a programmer can take two or more individually complete pieces of existing software and write additional code or amend the code of the existing software so that the functionality of each existing software product are included in a new integrated product.

Regarding the latter, the software products that are to be integrated are often developed by different parties, totally independently and without any regard or thought to the possible future desire to integrate with another foreign product. Therefore, the process of integrating two existing software products often involves solving numerous technical compatibility issues in order for the existing products to function together in a relatively cohesive fashion.

SUMMARY

Disclosed herein is a computer implemented method for confirming the completion of an onboarding setup item of an IT Service Management (ITSM) system, the system comprising a first software platform, a second software platform, and an intermediary onboarding platform operatively associated with a database for storing a state of the setup item, the setup item being associated with at least one of the first and second software platforms, the method comprising: receiving, via a user interface, input data associated with at least one of the first and second software platforms; querying the received input data against completion criteria from the at least one of the first and second software platforms, wherein the setup item has a predetermined item type, the predetermined item type being one of a critical setup item type, and a non-critical setup item type, whereby the completion criteria is dependent on the predetermined item type such that: if the setup item is the critical setup item type, the completion criteria comprises reconciling the state of the setup item with corresponding data from at least one of the first and second software platforms which ascertains if one or more tasks associated with the setup item have been completed; and if the setup item is the non-critical setup item type, the completion criteria comprises comparing, by the user interface, the received input data against one or more predetermined user interface actions to be completed, wherein the one or more actions being determined as completed infers the setup item is confirmed as completed; updating the state of the setup item in the associated database to a state indicative of the setup item being completed; and displaying, by the user interface, a visual indication of confirmation of the completion of the setup item.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the present disclosure. It will be apparent, however, that the embodiments described herein may be practiced without these specific details. In some instances, well-known structures and devices are shown in block diagram form in order to avoid unnecessary obscuring.

As described above, existing independent software products can be integrated into a single integrated software product. Such existing independent software products include, amongst other systems, issue tracking systems and incident management systems, for example.

Very generally speaking, an issue tracking system such as Atlassian's Jira allows users to perform various actions with respect to the creation and management of issues. This includes, for example, defining issue types, issue workflows, creating projects, creating issues, associating issues with projects and/or other issues, transitioning issues between workflow states, editing information associated with issues, assigning issues to specific people/teams. An issue tracking system such as Jira also allow for certain operations to be automated. For example automation rules may be created which if triggered, cause certain operations to be performed. For example, an automation rule may be defined that causes a particular user (or user group) to be notified if an issue transitions from one particular state to another.

Use of an issue tracking system may involve creating a project corresponding to a software product (for example, project A corresponds to software product A). Various aspects of the software development process for that product can then be tracked: for example a person who comes up with an idea for a new feature for software product A may create a 'new feature' issue (or set of related issues) for the feature and associate the issue with project A. As development of feature A progresses (for example, planned, developed, built, tested, released), the feature A issue transitions through various workflow states with information being added to the issue by the relevant stakeholders.

Also generally speaking, an incident management system such as Atlassian's Opsgenie monitors one or more software platforms, and tracks and alerts users to incidents (that is, an unplanned interruption, or potential interruption, to an IT service and/or quality reduction of an IT service) or major incidents (that is, an incident or incidents that result in significant disruption to a service overall) in order to have those incidents or major incidents resolved efficiently with the aim of minimising downtime. Further, the incident management system provides a corresponding level of alert and notification (through various avenues including email, voice calls, SMS, and/or specific push notifications, amongst others) and directs the alerts and notifications to the relevant personnel in order to correct the incident within an acceptable time frame, within the context of the overall system. This includes, for example, defining incident types, issue correction workflows based on the incident, generally reformat monitoring data into more meaningful information including providing reference documentation that may assist in rectifying an incident, and assigning incidents to specific users/teams.

As noted above, an incident management system such as Opsgenie may be integrated into (or with) an existing software system, such as an IT Service Management framework, in order to track incidents that arise during use of the IT Service Management framework. Such use commonly involves planning and actions in relation to the use of an IT Service Management workspace, and the development of software projects both from the early developmental stages prior to prototype and/or minimum viable product (MVP) completion to ongoing development of additional features of fully operational software. It will be appreciated that incident management systems can also be integrated into other software such as other software as a service (SaaS) platforms or licensed software products, and provide incident management for the ongoing service.

In view of the integration of an issue tracking system with an incident management system into the one integrated system, or at least the integration of the entire functionality of each of these two systems into the one integrated system, the present disclosure relates to providing systems and methodologies for integrating the respective onboarding processes of an issue tracking system and an incident management system into a single seamless integrated onboarding process for the two collectively integrated systems that enables the integrated system to be initialised, from an external perspective, by way of a single onboarding process.

Figure 1:
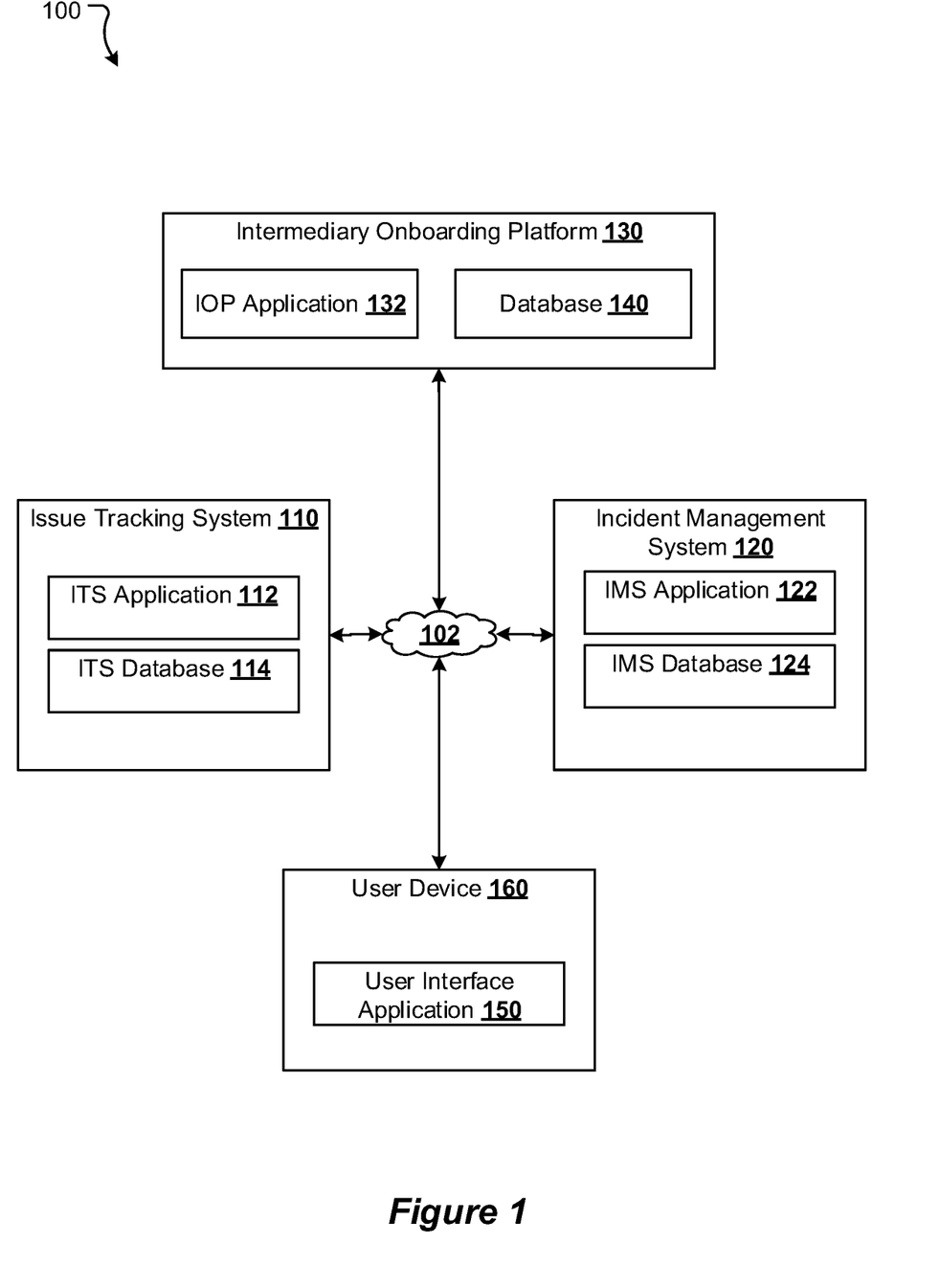
FIG. 1 is a block diagram of an IT service management (ITSM) framework system according to aspects of the present disclosure/in which various features of the present disclosure may be implemented.

Referring to FIG. 1, there is illustrated an IT service management (ITSM) framework system 100 which exists in a networked environment in which embodiments and features of the present disclosure are implemented. System 100 includes: a first software platform in the form of an Issue Tracking System (ITS) 110; a second software platform in the form of an Incident Management System (IMS) 120; and an intermediary onboarding platform 130, all of which are interconnected by a communications network 102. It is noted that, for ease of reference: the acronyms in parentheses will be used herein in place of each of the full form names of the systems. In some embodiments, platform 130 is a microservice platform, but in other embodiments, may be a platform other than a microservice. Platform 130 is operatively associated with a database 140 (which, in the present embodiments, is a NoSQL database such as Amazon's DynamoDB) and is configured to communicate directly with each of ITS 110 and IMS 120 via network 102 in order to coordinate integrated onboarding of ITS 110 and IMS 120. Further, ITSM system 100 also includes a user interface which, in the present embodiments, includes a number of components one of which is a user interface application 150 for enabling interaction with each of: ITS 110, IMS 120 and platform 130 via network 102. User interface application 150 is configured to operate on a user device 160 and display content sourced from both ITS 110 and IMS 120.

User device 160 is a computer processing system with user interface application 150 operable thereon essentially operating as both ITS and IMS client applications integrated into a single user interface application. When executed by user device 160 (for example, by a processing unit such as 202 described below), user interface application 150 configures user device 160 to provide client-side ITS and IMS functionality. This involves communicating (using a communication interface such as 216 described below) with ITS 110 and IMS 120 (and, in particular, ITS server application 112 and IMS server application 122). User interface application 150 is accessed via a web browser (such as Chrome, Safari, Internet Explorer, Firefox, or an alternative we browser) which communicates with the web server of ITS server application 122 and IMS server application 122 using http/https protocols. It will be appreciated that in other embodiments, the user interface application 150 is other than browser-based, such as a dedicated client-side application specific programmed to access the other components of system 100 using defined application programming interface (API) calls, but generally in a similar fashion to the browser-based user interface application 150 (as will be described in more detail below).

It will be appreciated that user device 160 will also have other applications installed/running thereon, for example an operating system.

Furthermore, it will be appreciated that in reality, multiple individual user devices will run user interface application 150, with each user device configured to interact with ITS 110 and IMS 120. User device 160 may be any form of computing device as will be discussed in more detail below with reference to FIG. 2.

ITS 110 hosts ITS server application 112. ITS server application 112 is executed by ITS 110 to configure it to provide ITS server-side functionality to application(s) of platform 130 (as will be discussed further below) and/or to one or more corresponding client applications (for example, user interface application 150 as discussed above). In other words, ITS server application 112 provides ITS server-side functionality referred to as "back-end" functionality and interactions with user interface application 150 referred to as "front-end" functionality. It will be appreciated that back-end and front-end functionality may comprise additional functionality and interactions to those set out above. ITS server application 112 comprises one or more application programs, libraries, APIs or other software elements that implement the features and functions that are described herein. ITS server application 112 takes the form of a web server such as Apache, IIS, nginx, GWS, or an alternative web server, or a combination of web servers of various types for interacting, directly or indirectly, with user interface application 150 and for interacting with application(s) of platform 130 over network 102. In embodiments where user interface application 150 is a dedicated application, ITS server application 112 will be an application server configured specifically to interact with the dedicated version of user interface application 150.

In other embodiments, ITS 110 is provided with both web server and application server modules.

Further, the back-end functionality of ITS server application 112 includes accessing one or more ITS databases of ITS 110 (collectively denoted by reference 114) which store data relevant to the services being offered by ITS 110. Such data includes data indicative of the completion of onboarding setup items from an ITS onboarding setup item checklist. Other such data includes, for example, user account data, user permissions data, data in respect of issues maintained by the ITS, and/or other data relevant to the operations of the ITS.

One example of an ITS 110 that can be configured to provide the functionality described herein is Jira.

IMS 120 hosts IMS server application 122. IMS server application 122 is executed by IMS 120 to configure it to provide IMS server-side functionality to application(s) of platform 130 and/or to one or more corresponding client applications (for example, user interface application 150). In other words, IMS server application 122 provides IMS server-side functionality referred to as "back-end" functionality and interactions with user interface application 150 referred to as "front-end" functionality. It will be appreciated that "back-end" and "front-end" functionality may comprise additional functionality and interactions to that set out above. IMS server application 122 comprises one or more application programs, libraries, APIs or other software elements that implement the features and functions that are described herein. IMS server application 122 takes the form of a web server such as Apache, IIS, nginx, GWS, or an alternative web server, or a combination of web servers of various types for interacting, directly or indirectly, with user interface application 150 and for interacting with application(s) of platform 130 over network 102. In embodiments where user interface application 150 is a dedicated application, IMS server application 122 will be an application server configured specifically to interact with the dedicated version of user interface application 150.

In other embodiments, IMS 120 is provided with both web server and application server modules.

Further, the back-end functionality of IMS server application 122 includes accessing one or more IMS databases of IMS 120 (collectively denoted by reference 124) which store data relevant to the services being offered by IMS 122. Such data includes data indicative of the completion of onboarding setup items from an IMS onboarding setup item checklist. Other such data includes, for example, user account data, user permissions data, data in respect of issues maintained by the IMS, and/or other data relevant to the operations of the IMS.

One example of an IMS 120 that can be configured to provide the functionality described herein is Opsgenie.

Platform 130 hosts an intermediary onboarding application 132. Onboarding application 132 is executed by platform 130 to configure it to provide server-side functionality, in particular storing, maintaining and updating item states for an integrated onboarding setup item checklist. In other embodiments, onboarding application 132 is executed by platform 130 to configure it to provide integrated ITS and IMS server-side functionality to one or more corresponding client applications (for example, user interface application 150). Onboarding application 132 comprises one or more application programs, libraries, APIs or other software elements that implement the features and functions that are described herein. Onboarding application 132 also takes the form of a web server (as described above) for interacting, directly or indirectly, with user interface application 150 and for interacting directly with each of ITS server application 112 and IMS server application 122. In other embodiments, onboarding application 132 may interact indirectly with each of ITS server application 112 and IMS server application 122 (for example, making an API call to an alternative endpoint and that endpoint receiving and passing the request to ITS server application 112 and/or IMS server application 122). In embodiments where user interface application 150 is a dedicated application, onboarding application 132 will be an application server configured specifically to interact with the dedicated version of user interface application 150, along with each of ITS server application 112 and IMS server application 122.

Platform 130 is specifically developed for the purpose of integrating the onboarding processes and aggregating state records of onboarding setup items for ITS 110 and IMS 120, and in particular to storing, maintaining and updating item states for an integrated onboarding setup item checklist. The system is such that user interface application 150 will display to the user a single integrated onboarding process based on a single an integrated onboarding setup item checklist.

Further, onboarding application 132 provides access to database 140 which stores data relevant to the functionality being offered by platform 130, that functionality primarily being, very generally speaking, to maintain the integrated onboarding setup item checklist of integrated onboarding setup items, update the checklist item states when the relevant completion criteria is met and, in some embodiments, provide this information for display to the user on user device 160 via user interface application 150. Such data stored in database 140 includes state data indicative of completion of integrated onboarding setup items from an integrated onboarding setup item checklist, which will be explained in more detail below. As noted above, database 140 is a NoSQL database. However, in other embodiments, database 140 is of a type other than NoSQL. Further, it will be appreciated that database 140, in various embodiments, may be a single database or multiple networked databases depending on the requirements of system 100.

ITS 110 and IMS 120 are configured to broadcast (e.g. via a publication/subscription type service) events in response to certain changes, including state changes. Platform 130 subscribes to the event service of ITS 110 and IMS 120 such that it is configured to respond to certain events broadcast by ITS 110 and IMS 120.

In other embodiments, onboarding application 132 is provided with both web server and application server modules.

Communications network 102 may be a local area network, public network (for example, the Internet), or a combination of both.

Integrated onboarding setup item checklists can be created based on: a specific ITSM project; a specific customised ITSM workspace for creating projects; a specific known user of system 100; and an aggregate of the three prior bases. Broadly speaking, when, for example, a new project is created or a new user is added to a project or workspace, ITS 110 and/or IMS 120 will direct platform 130 to create a storage entity within database 140 to store a new integrated onboarding setup item checklist based on the project created or user added, such factors determining which integrated onboarding setup item checklist template is used as a starting point (the checklist can be amended to vary from the template depending on specific requirements of the project or user). Each integrated onboarding setup item checklist includes a number of general setup parameters also stored in database 140 including: the type of workspace, which identifies the tenant across ITS 110 and IMS 120; an ID of the workspace (that is, an identifier of the workspace); the type of container (for example, project or Opsgenie team); ID of the container (that is, an identifier of the container); ID of the checklist itself (that is, an identifier of the checklist which is validated against the workspace type); and account ID (that is, an identifier of the user). For example, in relation to specific user-based integrated onboarding setup item checklists, the parameters associated with the checklist include (with variable name in parentheses) amongst others: the ID of the user (accountId); the ID of the container (containerId); the type of checklist (listKey); the type of workspace, which identifies the tenant across ITS 110 and IMS 120 (workspaceTypeKey); the ID of the workspace (workspaceId); the version of the checklist, if a checklist in relation to a user has been updated or altered over time (listVersion) could be additions to checklist, the time a checklist was created (createdTimeStamp); and the setup items of the checklist that have been completed (completedItems).

While ITS 110, IMS 120 and platform 130 are each depicted and described as a single server machine, alternative architectures are possible. For example, in certain cases a clustered server architecture may be used where multiple server computing instances (or nodes) are instantiated on one or more computer processing systems to meet system demand. Conversely, in the case of small enterprises with relatively simple requirements ITS 110, IMS 120 and platform 130 may be from a stand-alone implementation (i.e. a single computer directly accessed/used by end users) or each hosted at the same locale whereby external access (for example, by user interface application 150) is facilitated by network 102. Each of ITS 110, IMS 120 and platform 130 have been illustrated as single systems. However, each of ITS 110, IMS 120 and platform 130 can be a scalable server system comprising multiple nodes which can be commissioned/decommissioned based on processing requirements.

While system 100 has been provided as an illustrated example networked environment, alternative system environments/architectures are possible.

It is noted that ITS 110 and IMS 120 are existing independent software products that are not readily compatible. Insofar as ITS 110 and IMS 120 are integrated into a single software platform, these back-end server systems essentially function individually as standalone platforms that do not communicate directly with each other. Whilst the onboarding functionality is driven by the user interface along with ITS 110 and IMS 120, the integrated onboarding setup item checklist and the respective item states are maintained by platform 130 in database 140. This arrangement negates the need for ITS 110 and IMS 120 to communicate directly with each other in respect of the integrated onboarding. In alternate embodiments, the onboarding functionality is driven by platform 130.

While the onboarding application 132 (and associated database 140) are depicted as being deployed on a separate platform (that being platform 130) they could be deployed on either ITS 110 or IMS 120.

User interface application 150 is generally able to directly communicate with ITS 110, IMS 120 and platform 130. Generally speaking, however, user interface 150 will respond to ITS 110 and IMS 120 in regards to the content displayed sourced from ITS 110 and IMS 120 respectively. One exception is for content related specifically to the onboarding of ITS 110, where user interface application 150 continually polls platform 130 for state changes and will update itself based on any relevant changes at platform 130.

It will be appreciated that in some embodiments, platform 130 is able to communicate with ITS server application 112 specifically for directly driving front-end functionality (i.e. not via the back-end functionality of ITS server application 112) such as providing direct communicating instructions to user interface application 150 for data related to ITS 110 (this includes content that is displayed in relation to ITS 110 by user interface application 150). However, for data related to IMS 120 (such as content that is displayed in relation to IMS 120 by user interface application 150), platform 130 firstly communicates to IMS server application 122 that in turn drives the front-end functionality (i.e. via the back-end functionality of IMS server application 122) such as communicating instructions to user interface application 150 for data related to IMS 120. In alternate embodiments, platform 130 is able to communicate with IMS server application 122 specifically for directly driving front-end functionality (i.e. not via the back-end functionality of IMS server application 122) such as providing direct communicating instructions to user interface application 150 for data related to IMS 120 (such as content that is displayed in relation to IMS 120 by user interface application 150). In yet other embodiments, for data related to ITS 110 (such as content that is displayed in relation to ITS 110 by user interface application 150), platform 130 firstly communicates to ITS server application 112 that in turn drives front-end functionality (i.e. via the back-end functionality of ITS server application 112) such as communicating instructions to user interface application 150 for data related to ITS 110. In yet other embodiments, user interface application 150 is also able to directly communicate with platform 130.

Various embodiments and features of the present disclosure are implemented using one or more computer processing systems.

Figure 2:
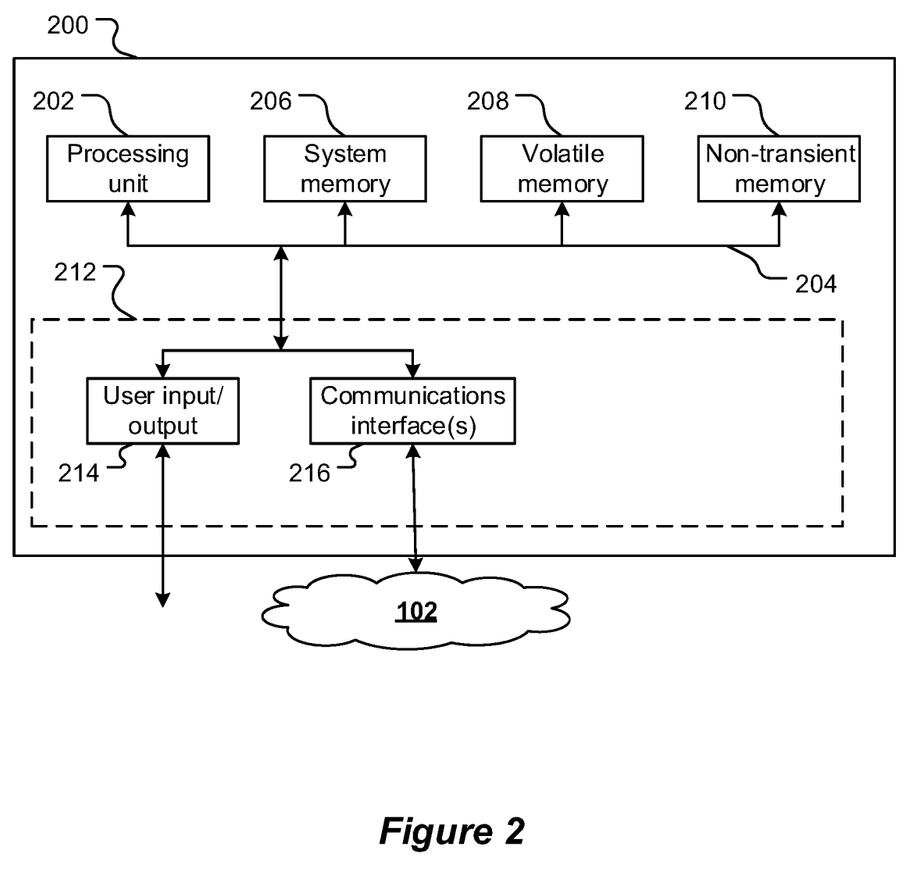
FIG. 2 is a block diagram of a computing system with which various embodiments of the present disclosure may be implemented/configurable to perform various features of the present disclosure.

FIG. 2 provides a block diagram of a computer processing system 200 configurable to implement embodiments and/or features described herein. System 200 is a general-purpose computer processing system. It will be appreciated that FIG. 2 does not illustrate all functional or physical components of a computer processing system. For example, no power supply or power supply interface has been depicted. However, system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202—for example a general or central processing unit, a graphics processing unit, or an alternative computational device). In other embodiments, computer processing system 200 may include a plurality of computer processing units. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204, processing unit 202 is in data communication with a one or more computer readable storage devices which store instructions and/or data for controlling operation of the processing system 200. In this example system 200 includes a system memory 206 (for example, BRSS), volatile memory 208 (for example, random access memory such as one or more DRAM modules), and non-volatile (or non-transitory) memory 210 (for example, one or more hard disk or solid state drives). Such memory devices may also be referred to as computer readable storage media.

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), FireWire, eSATA, Thunderbolt, Ethernet, SS/2, Parallel, Serial, HDMI, DVI, VGA, SCSI, AudioPort, and/or any other possible wired connection hardware/connectivity protocol.

Wireless connection with other devices/networks may similarly be by any appropriate standard or proprietary hardware and communications protocols, for example infrared, Bluetooth, WiFi; near field communications (NFC); Global System for Mobile Communications (GSM), Enhanced Data GSM Environment (EDGE), long term evolution (LTE), code division multiple access (CDMA—and/or variants thereof such as wideband CDMA), and/or any other possible wireless hardware/connectivity protocol.

Generally speaking, and depending on the particular system in question, devices to which system 200 connects—whether by wired or wireless means—include one or more input/output devices (indicated generally by input/output device interface 214). Input devices are used to input data into system 200 for processing by the processing unit 202. Such input devices may include keyboards, mice, trackpads, microphones, accelerometers, proximity sensors, GPS devices and the like. Output devices allow data to be output by system 200. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input). It will be appreciated that not all computer processing systems will include all input/output mentioned devices, and that additional and alternative devices to those mentioned may well be used.

System 200 also includes one or more communications interfaces 216 for communication with a network, such as network 102 of system 100 (and/or a local network, for example, within ITS 110). Via a communications interface(s) 216, system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory computer readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows®, Apple macOS, Apple iOS, Android, Unix, or Linux.

System 200 also stores or has access to applications which, when executed by the processing unit 202, configure system 200 to perform various computer-implemented processing operations described herein. For example, and referring to the networked environment of system 100 of FIG. 1 above: user device 160 runs user interface application 150 which configures the user device to perform various operations described herein.

In some cases part or all of a given computer-implemented method will be performed by system 200 itself, while in other cases processing may be performed by other devices in data communication with system 200.

As will be appreciated, each of ITS 110 and IMS 120 have respective onboarding requirements in the form of onboarding setup items to be completed for each of ITS 110 and IMS 120 to be initialised for "normal" use. System 100 prompts the user to complete these items through an initialisation process facilitated by a displayed integrated onboarding user interface of the user interface presented to the user via user interface application 150. The displayed integrated onboarding user interface includes a high level graphical version of an integrated onboarding setup item checklist, which will be described in more detail further below with reference to FIG. 5A. In that regard, as noted above, each of ITS 110 and IMS 120 include their own respective checklist of onboarding setup items to be completed.

For example, when a new project is commenced within system 100, such as a new Jira ITSM project, ITS application 112 and IMS application 122 initiate a checklist setup event that, as noted above, includes instructing onboarding application 132 to create a new storage entity within database 140 for storing a new integrated onboarding setup item checklist containing a plurality of integrated onboarding setup items based on a new integrated onboarding setup item checklist template. Each of the integrated onboarding setup items from a checklist includes an item state indicative of completion or non-completion. As indicated above, the item states are stored within database 140. For completeness, the integrated onboarding setup item checklist may include only a single integrated onboarding setup item, but in practice this would be an extremely rare scenario.

The plurality of integrated onboarding setup items is based on the respective onboarding setup items for each of ITS 110 and IMS 120, such that completion of the integrated onboarding setup items is indicative of completion of onboarding setup items for each of ITS 110 and IMS 120. In other embodiments, the integrated onboarding setup item checklist is manually curated in that the integrated onboarding setup items are manually chosen and inputted into system 100 to form the checklist.

An integrated onboarding setup item refers to is what is presented to the user by the user interface application 150 during an onboarding process. Each integrated onboarding setup item includes its own specific unique completion criteria that will be predefined by ITS 110 and/or IMS 120, this predefinition including one or more predefined actions or tasks to be completed. The user is prompted by user interface application 150 to complete the one or more predefined actions or tasks such that, once they are completed, the completion criteria is met. Once the completion criteria is confirmed as met, the state associated with the integrated onboarding setup item that is stored in database 140 will be updated from a state indicative of the setup item not being completed to a state indicative of the setup item being completed. User interface application 150 will prompt the to complete one or more predefined actions or tasks in order to meet the completion criteria for each and every integrated onboarding setup item on the checklist so that the onboarding process is completed and normal use of system 100 can commence.

For a newly created integrated onboarding setup item checklist, generally speaking, the setup item states default to a state indicative of the integrated onboarding setup items not having been completed, referred to here as "not completed", as would be the case for a new project where the onboarding process has yet to commence. The states of the setup items will only update or transition to a state indicative of the integrated onboarding setup items being "completed" once certain requisite completion criteria in the form of one or more predefined actions or tasks have been undertaken. One exception is if one setup item of the integrated onboarding setup item checklist is to actually create the integrated onboarding setup item checklist, in which case that setup item would be allotted a "completed" indicative state on the newly created integrated onboarding setup item checklist. It will be appreciated that in other embodiments, there will exist other setup item states in addition to "not completed" and "completed", for example, transitional states such as "partially completed" which indicates some but not all of the requisite completion criteria is met.

Each integrated onboarding setup item has a predetermined item type, the predetermined item type being one of: a critical setup item type; and a non-critical setup item type. Completion criteria is dependent on the predetermined item type, as well as the specific requirements on the individual integrated onboarding setup item. It will be appreciated that the plurality of integrated onboarding setup items of the integrated onboarding setup item checklist will be a combination of item types, i.e. at least one of the integrated onboarding setup items being of the critical setup item type and at least one of the integrated onboarding setup items being of the non-critical setup item type. In some scenarios, all items on the integrated onboarding setup item checklist will be of the same item type, i.e. all of the critical setup item type or all of the non-critical setup item type.

An integrated onboarding setup items of the critical setup item type is such that the indicative state of that integrated onboarding setup item can only be updated to "completed" once ITS 110 and/or IMS 120 reconciles data from ITS database 114 and/or IMS database 124 related to one or more tasks associated with the integrated onboarding setup item, or related to a corresponding setup item for ITS 110 and/or IMS 120, with platform 130. This reconciling determines with certainty that the requisite completion criteria has been met, and completed correctly. Therefore, the indicative state of that integrated onboarding setup item is updated to "completed" with absolute certainty that is required for a critical item type if the reconciling results in the ITS database 114 and/or IMS database 124 confirming that the requisite completion criteria has been met, and completed correctly. As such, the state indicating the integrated onboarding setup item is "completed" for critical items in the database 140 will mirror the completed status of any one or more corresponding onboarding setup item for ITS 110 and/or IMS 120.

Figure 3:
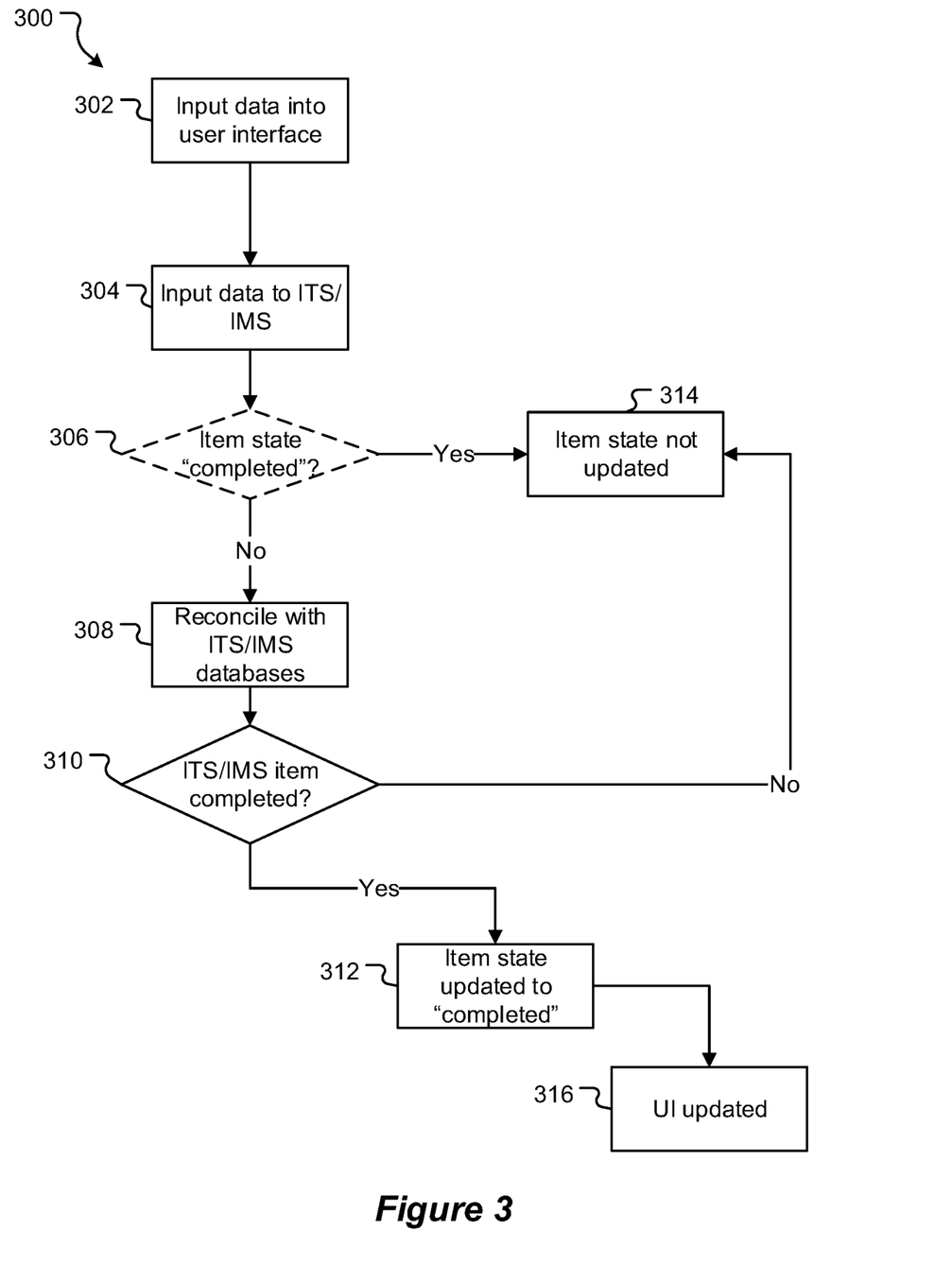
FIG. 3 provides a flowchart indicating operations performed by the systems of FIGS. 1 and 2 to update an indicative completion state of an integrated onboarding setup item of a critical setup item type.

Referring to FIG. 3, there is illustrated the process undertaken by a computer processing system of system 100 for updating the state of an integrated onboarding setup item that is a critical item type, the process denoted by reference 300.

At 302, user interface application 150 presents the displayed integrated onboarding user interface to the user in order facilitate the user entering in input data in response to the graphical version of an integrated onboarding setup item checklist. The input data comprises information entered by the user that will be in relation to a specific integrated onboarding setup item, the input data including but not limited to:

The selection and/or accessing of a Uniform Resource Locator (URL), that is, clicking a particular link thereby signifying and/or confirming a particular webpage has been visited by the user;

Uploading a file in a one or more acceptable file formats;

The selection of one or more of a plurality of discrete options, for example, selecting one or more predefined checkbox/check button options or a dropdown list option;

The manual input of data into a predetermined data field, for example, manually inputting text into a text field; and A combination of two or more of the above actions.

At 304, the input data is transmitted to ITS 110 and/or IMS 120 so that those systems (that is, each of ITS database 112 and IMS database 122) are appropriately updated based on the input data of the user.

In some embodiments, at 306, database 140 is queried to ascertain whether the state is indicative of the related integrated onboarding setup item being "completed". If it is the case where the state is indicative of the related integrated onboarding setup item being already "completed", then the indicative state of that related integrated onboarding setup item will not be changed, denoted by reference 314. It will be appreciated that 306 is an optional step that may not be present in all embodiments.

Following the receipt of the input data by ITS 110 and/or IMS 120 at 304 (or for the embodiment including step 306, if it is the case where the state is indicative of the related integrated onboarding setup item being "not completed"), at 308, ITS application 112 and/or IMS application 122 reconciles data from ITS database 114 and/or IMS database 124 respectively that is related to one or more actions or tasks associated with the integrated onboarding setup item completion criteria managed by platform 130 and/or an ITS and/or IMS setup item (which itself may involve one or more actions or tasks) associated with the integrated onboarding setup item managed by platform 130. More specifically, ITS database 114 and/or IMS database 124 will be updated such that the data related to the one or more actions or tasks (and/or the data related to the ITS and/or IMS setup item corresponding to the integrated onboarding setup item) will be indicated as being completed in ITS database 114 and/or IMS database 124 which will cause a broadcast event subscribed to by platform 130.

The one or more actions or tasks including those in respect of the ITS and/or IMS setup item include, but are not limited to:

The accessing of one or more specific predetermined URLs, that is, clicking one or more particular links and accessing one or more particular webpages by the user;

The accessing of one or more specific predetermined URLs and accessing one or more particular webpages by the user with the user staying on the one or more webpages for a predetermined amount of time, for example, two minutes (thereby signifying the user absorbing the contents of the web page);

The accessing of a plurality of specific predetermined URLs in a predefined order;

Uploading a specific file in a specific file format that includes acceptable information therein;

The selection of one or more of a plurality of discrete predetermined options, for example, selecting one or more predefined checkbox/check button options or a dropdown list option;

The manual input of specific data into a predetermined data field, for example, manually inputting text into a text field; and A combination of two or more of the above actions or tasks.

At 310, if the reconciling of ITS database 114 and/or IMS database 124 with platform 130 ascertains that the actions or tasks associated with the integrated onboarding setup item (and/or the ITS and/or IMS item associated with the integrated onboarding setup item) is not completed and thus the associated completion criteria of the integrated onboarding setup item is not met, then the indicative state of the related integrated onboarding setup item will not be updated as no event will be broadcast, denoted by reference 314, and remain as "not completed".

If, at 310, the associated completion criteria of the integrated onboarding setup item is met, at 312, broadcast event will occur that will trigger onboarding application 132 to update the state of the related integrated onboarding setup item in database 140 to a state indicative of being "completed".

Alternatively, the input data received by ITS 110 and/or IMS 120 will be recognised by ITS application 112 and/or IMS application 122 as relating to an integrated onboarding setup item that is a critical item type, and in response to this recognition, ITS 110 and/or IMS 120 will send a direct instruction to platform 130 once the one or more actions or tasks (and/or the data related to the ITS and/or IMS setup item corresponding to the integrated onboarding setup item) are indicated as being completed in ITS database 114 and/or IMS database 124.

At 316, after or when onboarding application 132 is instructed to update the item state, ITS application 112 and/or IMS application 122 instructs user interface application 150 to display a visual indication of confirmation of the completion of the related integrated onboarding setup item.

This will be described in more detail further below with reference to FIG. 5B. In other embodiments, onboarding application 132 relays to user interface application 150 to display a visual indication of confirmation of the completion of the related integrated onboarding setup item.

An integrated onboarding setup items of the non-critical setup item type is such that the indicative state of that integrated onboarding setup item can be updated to "completed" if requisite completion criteria in the form of one or more user interface actions to be completed is completed by user interface application 150. In other words, for a non-critical item type, the indicative state of that integrated onboarding setup item is updated to "completed" based on completion criteria, in the form of the one or more user interface actions, that only shows an adequate indication likelihood of certain ITS and/or IMS actions or tasks being completed correctly, rather than this being confirmed with certainty (as would occur for a critical item type). As ITS database 114 and/or IMS database 124 are not reconciled with platform 130, the state indicating the integrated onboarding setup item is "completed" for non-critical items in the database 140 will not necessarily be in conformity with, for example, the state of a corresponding onboarding setup items for ITS 110 and/or IMS 120. In other words, non-critical item types have their completion state updated based on the probability that the required ITS and/or IMS actions or tasks have been undertaken correctly, as opposed to the critical item type described above where a specific reconciling of ITS database 114 and/or IMS database 124 with platform 130 would confirm with certainty that the required ITS and/or IMS actions or tasks have been undertaken correctly. Whilst this does sacrifice complete accuracy, this use of non-critical item type has the advantage of avoiding the processing burden on system 100 in relation to setup items of this type as platform 130 will not have to be reconciled with ITS database 114 and/or IMS database 124 (in some cases reconciled multiple times) for each and every integrated onboarding setup item and in particular for integrated onboarding setup items where an incorrect item completion will not cause critical workflow issues to arise.

In other embodiments the completion criteria in the form of one or more user interface actions to be completed is confirmed by ITS 110 and/or IMS 120 to have been undertaken and completed.

Figure 4:
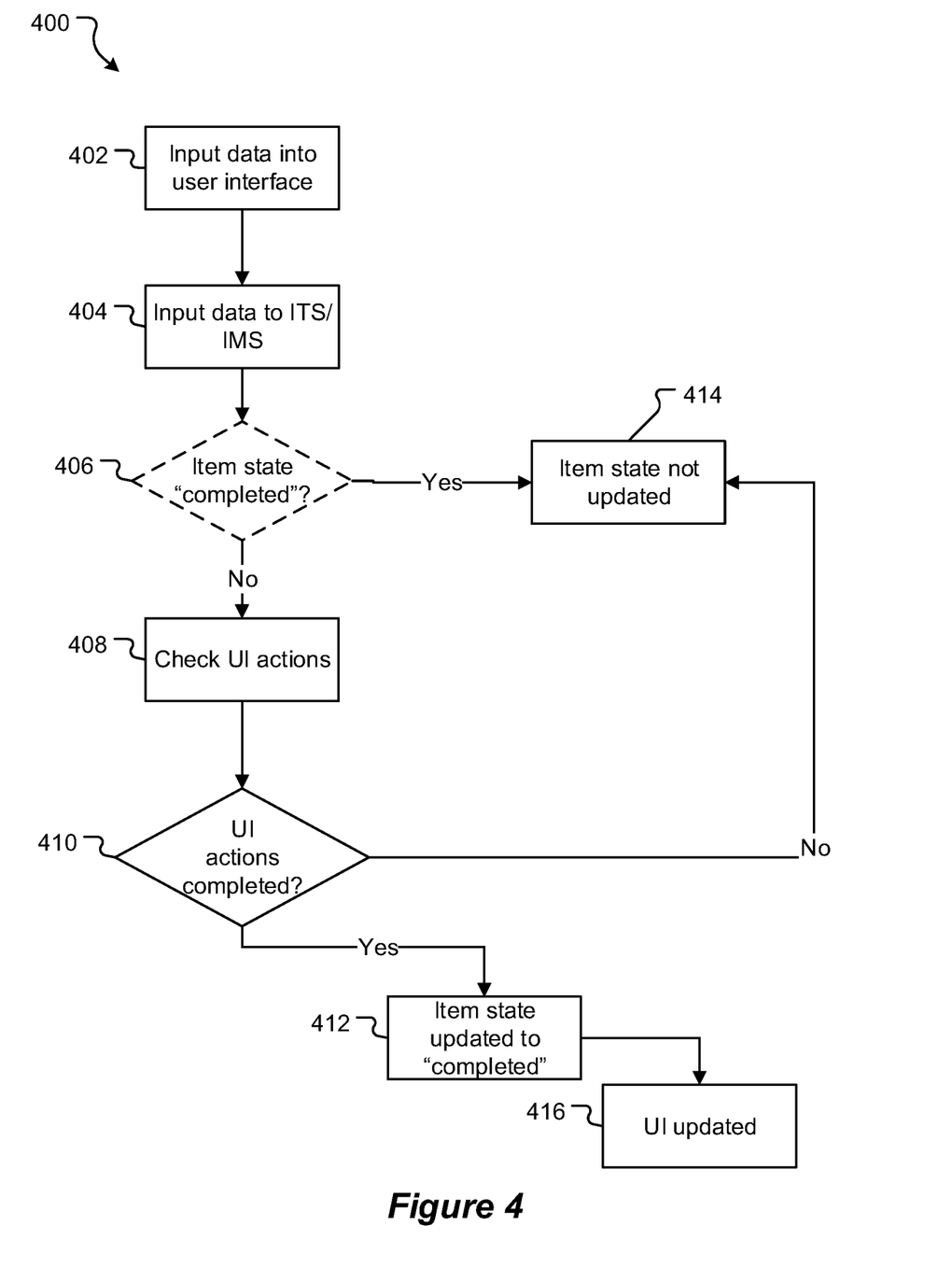
FIG. 4 provides a flowchart indicating operations performed by the systems of FIGS. 1 and 2 to update an indicative completion state of an integrated onboarding setup item of a non-critical setup item type.

Referring to FIG. 4, there is illustrated the process undertaken by a computer processing system of system 100 for updating the state of an integrated onboarding setup item that is a non-critical item type, the process denoted by reference 400.

At 402 (similar to 302 of FIG. 3), user interface application 150 presents the displayed integrated onboarding user interface to the user in order facilitate the user entering input data in response to the graphical version of an integrated onboarding setup item checklist. As above in relation to FIG. 3, the input data comprises information entered by the user that will be in relation to a specific integrated onboarding setup item, the input data including but not limited to:

The selection and/or accessing of one or more URLs, that is, clicking a particular URL link thereby signifying/confirming that a particular webpage has been visited by the user;

Uploading a file in a one or more acceptable file formats;

The selection of one or more of a plurality of discrete options, for example, selecting one or more predefined checkbox/check button options or a dropdown list option;

The manual input of data into a predetermined data field, for example, manually inputting text into a text field; and A combination of two or more of the above actions.

At 404 (similar to 304 of FIG. 3), the input data is transmitted to ITS 110 and/or IMS 120 so that those systems (that is, each of ITS database 112 and IMS database 122) are appropriately updated based on the input data of the user. It will be noted that step 404 does not affect the updating of the state of an integrated onboarding setup item that is a non-critical item type, but has been included for completeness as a destination of the input data.

In some embodiments, at 406 (similar to 306 of FIG. 3), database 140 is queried to ascertain whether the state is indicative of the related integrated onboarding setup item being "completed". If it is the case where the state is indicative of the related integrated onboarding setup item being already "completed", then the indicative state of that related integrated onboarding setup item will not be changed, denoted by reference 414. It will be appreciated that 406 is an optional step that may not be present in all embodiments.

Following the entering of input data at 402 and receipt of the input data by ITS 110 and/or IMS 120 at 404 or in some cases prior to or during the undertaking of step 404 (or for the embodiment including step 406, if it is the case where the state is indicative of the related integrated onboarding setup item being "not completed"), user interface application 150 will directly relay to platform 130 that the input data has been entered and, thus one or more user interface actions has been carried out. Therefore, the associated completion criteria of that integrated onboarding setup item of a non-critical item type would not require any interaction with ITS 110 or IMS 120 (including reconciling ITS database 114 and/or IMS database 124 with platform 130.

In alternate embodiments, following steps 402 and 404, ITS application 112 and/or IMS application 122 (in particular the front-end functionality of those applications) will recognise that the input data received by ITS 110 and/or IMS 120 relates to an integrated onboarding setup item that is a non-critical item type. In this case, the completion criteria will comprise, at 408, ITS application 112 and/or IMS application 122 recognising the received input data as one or more predetermined user interface actions to be completed that is associated with that integrated onboarding setup item of a non-critical item type.

If, at 410, the one or more user interface actions that has been carried out corresponds with one or more predetermined user interface actions that is associated with the integrated onboarding setup item to be completed, the completion criteria for the non-critical item is met and, the related integrated onboarding setup item has been completed. The predetermined user interface actions to be completed include, but are not limited to:

The indication that one or more specific predetermined URLs are accessed which includes, for example, selecting or clicking one or more particular URL links thereby signifying particular webpages have been visited by the user;

The indication that a plurality of specific predetermined URLs is accessed in a predefined order;

The selection and accessing of one or more specific predetermined URLs;

The selection and accessing of a plurality of specific predetermined URLs in a predefined order;

Uploading a file in a specific file format;

The selection of one or more of a plurality of discrete predetermined options, for example, selecting one or more predefined checkbox/check button options or a dropdown list option;

The manual input of data into a predetermined data field, for example, manually inputting text into a text field; and A combination of two or more of the above actions.

Unlike for the corresponding step in 310 in relation to critical item types, step 410 in relation to non-critical item types, as noted above, does not require any interaction with ITS 110 or IMS 120 and therefore does not require reconciling ITS database 114 and/or IMS database 124 with platform 130. As such, step 410 will generally not require scrutinising actions in as much detail as step 310 for critical items. For example, in relation to selecting or accessing a specific predetermined URL, step 410 may only require an indication by user interface application 150 the specific URL is visited by the user such as a link being clicked in order to meet the completion criteria, without needing to confirm that a website associated with the link had been visited let alone the content of that website absorbed by the user. On the other hand, step 310 may include the user actually clicking the link and accessing the webpage and even staying on that webpage for a minimum amount of time in order to meet the completion criteria. A yet further example, in relation to uploading a file, step 410 may only check that any file has been uploaded without assessing file content, whereas step 310 may include a specific file in a specific file format that includes acceptable information contained therein being uploaded in order to meet the completion criteria. A yet further example, in relation to manual input of text data, step 410 may only check that any text is inputted without assessing the content of the text, whereas step 310 may include specific acceptable text data being confirmed as entered in order to meet the completion criteria. As such, the related integrated onboarding setup item may be determined as completed based on an inference or adequate probability of completion rather than certain confirmation of completion.

In embodiments, the completion criteria comprises primary criteria and secondary criteria whereby in order for the completion criteria to be met, all primary criteria must be met but only a predefined subset of secondary criteria must be met. For example, predetermined user interface actions to be completed for the primary criteria could include uploading a file in a specific file format and the predetermined user interface actions to be completed for the primary criteria could include indications that five specific predetermined URLs are accessed by the user. In this example, to meet the completion criteria, a file must be uploaded in a specific file format to meet the primary criteria and any four of the five specific predetermined URLs must be indicated as being accessed.

If the one or more predetermined user interface actions to be completed by user interface application 150 have not been completed, i.e. it is ascertained that the completion criteria for the non-critical item is not met, then the indicative state of the related integrated onboarding setup item will not be changed, denoted by reference 414 and remain as "not completed".

At 412, the completion of the one or more user interface actions to be completed (i.e. the completion criteria for the non-critical item being met) will immediately trigger onboarding application 132 to update database 140 so that the state of the related integrated onboarding setup item in database 140 to a state indicative of being "completed". In this case, user interface application 150 directs onboarding application 132 to update database 140.

At 416, the updating of the indicative state to "completed" in database 140 will immediately or simultaneously trigger user interface application 150 to display a visual indication of confirmation of the completion of the related integrated onboarding setup item. In embodiments, onboarding application 132 relays to user interface application 150 to display a visual indication of confirmation of the completion of the related integrated onboarding setup item. In other embodiments, the updating of the indicative state to "completed" in database 140 will immediately or simultaneously trigger ITS application 112 and/or IMS application 122 to relay to user interface application 150 to display a visual indication of confirmation of the completion of the related integrated onboarding setup item.

It will be appreciated that for the embodiments described above, the processes undertaken by a computer processing system of system 100 for updating the state of an integrated onboarding setup item are essentially the same whether the item is associated with ITS 110 or IMS 120, or both, except for steps 316 and 416. However, in other embodiments, the processes undertaken by a computer processing system of system 100 for updating the state of an integrated onboarding setup item involves one or more different steps or additional steps depending on whether the item is associated with ITS 110 or IMS 120, or both. For example, and as noted above, in some embodiments, platform 130 is able to directly communicate with user interface application 150 in relation to the onboarding process data related to ITS 110. However, for data related to IMS 120 (such as content that is displayed in relation to IMS 120 by user interface application 150), platform 130 does not directly drive front-end functionality such as communicating instructions to user interface application 150 for data related to IMS 120, as this is driven by IMS server application 122. Therefore, the data flow of both of steps 316 and 416 would be different depending on if the related integrated onboarding setup item is associated with ITS 110 or IMS 120.

It will be appreciated that in embodiments where onboarding application 132 is executed by platform 130 to configure it to provide integrated ITS and IMS server-side functionality to one or more corresponding client applications (for example, user interface application 150), platform 130 drives and directly initiates all the state changes of the integrated onboarding setup items. For example, for an integrated onboarding setup item of the critical item type, intermediary onboarding application 132 initiates a check of ITS database 114 and/or IMS database 124 to ascertain whether the relevant completion criteria is met (as opposed to the above where ITS database 114 and/or IMS database 124 are updated from the input data and ITS 110 and/or IMS 120 drive the state changes based on the received data).

Figure 5A:
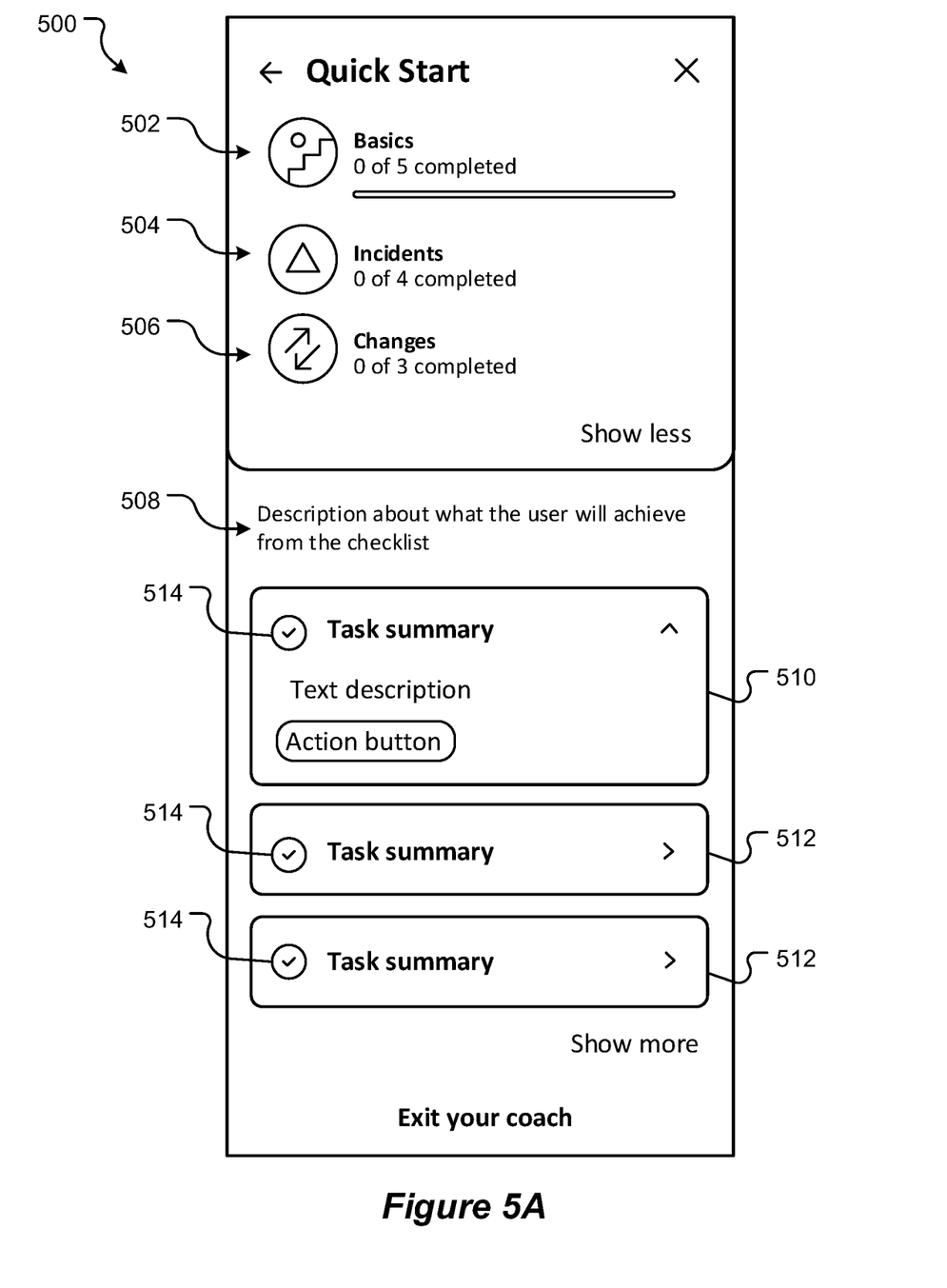
FIGS. 5A and 5B provide examples of wireframes of a user interface application of the system of FIG. 1.
Figure 5B:
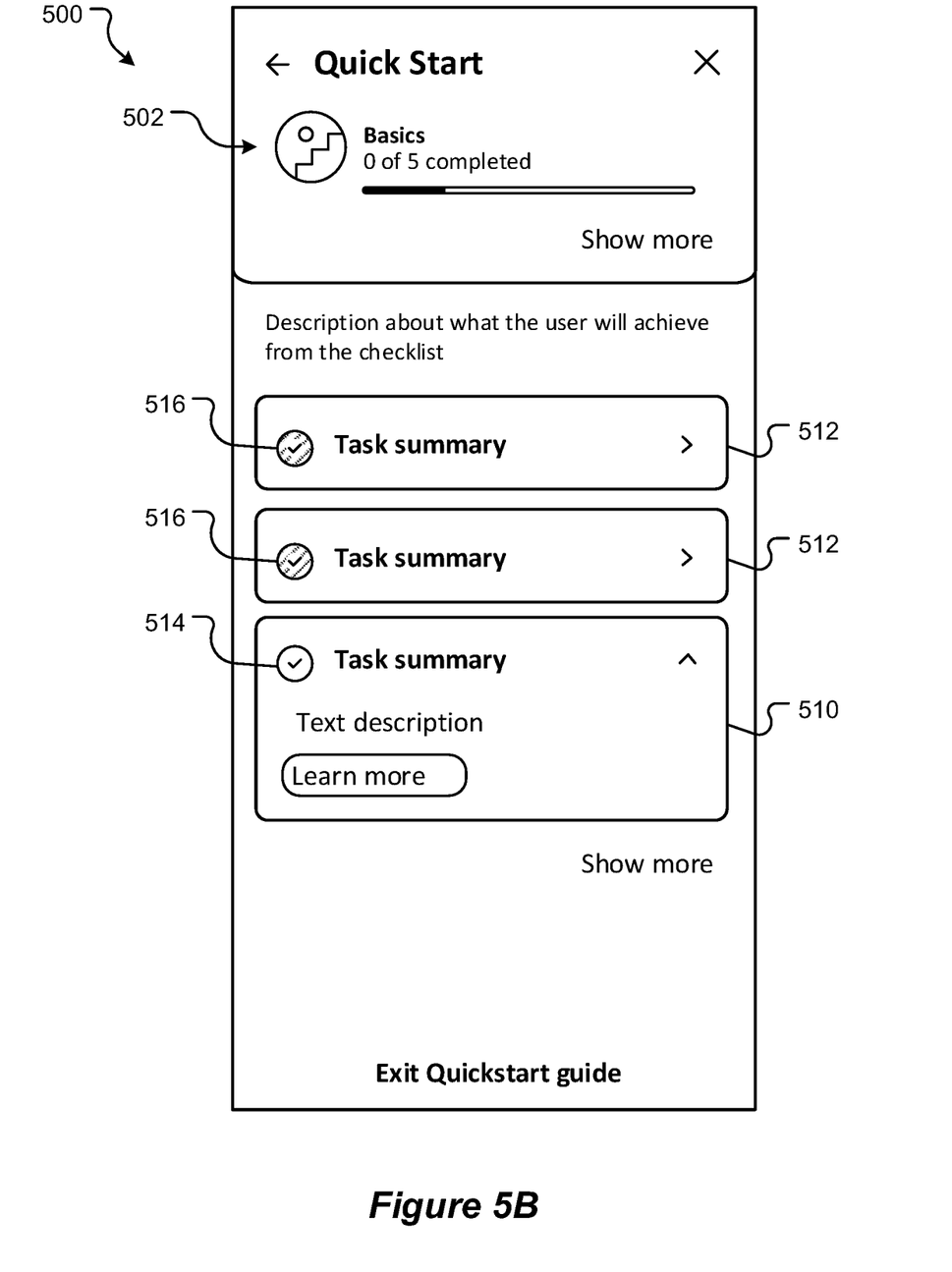

Referring to FIGS. 5A and 5B, there is illustrated example wireframes of user interface application 150, specifically showing the integrated onboarding user interface denoted by reference 500 for a new integrated project onboarding setup item checklist. Referring specifically to FIG. 5A, integrated onboarding user interface 500 includes three sub-groups of items shown in expanded view: basic new project setup items ("Basics" denoted by reference 502); items related to incidents and the management of incidents in relation to the project, in this case which are related to major incidents ("Incidents" denoted by reference 504); and items related to change management processes for the project ("Changes" denoted by reference 506). The three sub-groups separate items based on aligning work practices (which in practice may separate items according to their associated server-side system, for example, "Basics" relating to ITS 110, "Incidents" relating to IMS 120 etc.) In other embodiments, the sub-groups separate items based on their associated server-side system. In embodiments, each of 502, 504 and 506 can be expanded further to display the setup items within each sub-group. Integrated onboarding user interface 500 also includes a text description of the integrated onboarding setup item checklist at 508. Integrated onboarding user interface 500 further includes a plurality of integrated onboarding setup items cards from the checklist at 510 and 512, noting that card 510 shows an expanded form whilst cards 512 are both in minimised form. Expanded card 510 present a summary text description of the associated setup item task(s) along with a more detailed text description of those associated setup item task(s). Minimised cards 512 only present the summary text description of the associated setup item task(s). Cards 510 and 512 can be toggled between expanded form of 510 and minimised form of 512.

Integrated onboarding user interface 500 presents the user with visual indication of the progress of completion of setup items of the checklist. As seen in FIG. 5A, each of 502, 504 and 506 indicate that "0 of" the total number of items has been completed. Further, each of cards 510 and 512 are indicated as not being completed (by a white tick symbol 514). As such, this provides an example of visual indicator to the user for a new integrated onboarding setup item checklist of a new project where all the setup item states default to the "not completed" state.

Referring now to FIG. 5B, integrated onboarding user interface 500 is in a minimised view showing only "Basics" 502. Also shown is a plurality of integrated onboarding setup items cards from the checklist with expanded card 510 and two minimised cards 512. It will be seen here that 502 now shows the progress of setup item completion as "2 of 8 completed", indicating 2 of the 8 total setup items in the "Basics" 502 have been completed. Further, cards 512 of FIG. 5B are indicated as being completed (by a greyed tick symbol 516) whereas card 510 is indicated as not being completed (by white tick symbol 514).

FIG. 5B illustrates a partially completed checklist. It will be appreciated that a fully completed checklist would show, for example based on FIG. 5A, "5 of 5 completed" for "Basics" 502, "4 of 4 completed" for "Incidents" 504, and "3 of 3 completed" for "Changes" 506.

It will be appreciated that whilst embodiments described above are towards issue tracking systems and incident management systems, the first and second software platforms may be other than issue tracking systems and incident management systems that would also integrate their onboarding functionality as described above in respect of issue tracking systems and incident management systems.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer implemented method for confirming a completion of an onboarding setup item of an IT Service Management (ITSM) system, the ITSM system comprising a first software platform, a second software platform, and an intermediary onboarding platform operatively associated with a database for storing a state of the onboarding setup item, the method comprising:

receiving, via a user interface, input data associated with at least one of the first or the second software platforms of the ITSM system;

querying the received input data against completion criteria from the at least one of the first or the second software platforms, wherein the onboarding setup item being associated with the at least one of the first or the second software platforms and the onboarding setup item has a predetermined item type, the predetermined item type being at least one of (i) a critical setup item type associated with a requirement for a determination of verified accuracy for the completion of the onboarding setup item, and (ii) a non-critical setup item type associated with a requirement for a determination of an adequate indication of accuracy for the completion of the onboarding setup item, such that:

in accordance with the onboarding setup item having the critical setup item type, the completion criteria comprises reconciling the state of the onboarding setup item with corresponding data from the at least one of the first or the second software platforms, wherein the reconciling ascertains that one or more tasks associated with the onboarding setup item have been completed; and in accordance with the onboarding setup item having the non-critical setup item type, the completion criteria comprises comparing, by the user interface, the received input data against one or more predetermined user interface actions to be completed, wherein the one or more predetermined user interface actions being determined as completed infers the onboarding setup item is confirmed as completed;

updating the state of the onboarding setup item in the associated database to a state indicative of the onboarding setup item being completed; and displaying, by the user interface, a visual indication of confirmation of the completion of the onboarding setup item.

2. A computer implemented method according to claim 1, wherein the first software platform comprises an issue tracking system (ITS).

3. A computer implemented method according to claim 1, wherein the second software platform comprises an incident management system (IMS).

4. A computer implemented method according to claim 1, wherein the user interface is configured to directly interact with both the first and the second software platforms and at least indirectly interact via both the first and the second software platforms with the intermediary onboarding platform.

5. A computer implemented method according to claim 1, wherein the input data comprises at least one or more of: selection of a predetermined URL; selection of one of a plurality of discrete predetermined options; or data manually inputted into a predetermined data field.

6. A computer implemented method according to claim 1, wherein the user interface comprises a browser-based interface.

7. A computer implemented method according to claim 1, wherein the associated database for storing the state of the onboarding setup item comprises a NoSQL database.

8. A computer implemented method according to claim 1, wherein, if the onboarding setup item is the non-critical setup item type, the one or more predetermined user interface actions to be completed includes an action, by the user interface, indicative of accessing at least one predetermined URL.

9. A computer implemented method according to claim 8, wherein, if the onboarding setup item is the non-critical setup item type, the one or more predetermined user interface actions to be completed includes an action, by the user interface, indicative of accessing a plurality of predetermined URLs.

10. A computer implemented method according to claim 8, wherein the action, by the user interface, indicative of accessing the at least one predetermined URL, includes selecting the at least one predetermined URL to access.

11. A computer implemented method according to claim 10, wherein the action, by the user interface, indicative of accessing the at least one predetermined URL, includes selecting and accessing the at least one predetermined URL.

12. A computer implemented method according to claim 1, wherein the ITSM system comprises a plurality of setup items to be completed, the plurality of setup items forming an onboarding checklist of setup items that is stored in the database.

13. A computer implemented method according to claim 12, wherein at least one of the plurality of setup items is of the critical setup item type and at least one of the plurality of setup items is of the non-critical setup item type.

14. A computer implemented method according to claim 12, wherein at least one of the plurality of setup items is associated with the first software platform and at least one of the plurality of setup items is associated with the second software platform.

15. A computer implemented method according to claim 1, wherein, if the onboarding setup item is the critical setup item type, the corresponding data from the at least one of the first or the second software platforms includes corresponding state data from the at least one of the first or second software platforms.

16. A computer processing system for confirming a completion of a setup item associated with at least one of a first software platform or a second software platform, the system comprising:

one or more processing units;
a communication interface; and
a non-transitory computer-readable storage medium storing instructions, which when executed by a processing unit/one or more processing units, cause the one or more processing units to:
  receive from the communication interface, input data associated with at least one of the first or the second software platforms of an IT Service Management (ITSM) system, wherein the ITSM system comprises the first software platform, the second software platform, and an intermediary onboarding platform operatively associated with a database for storing a state of the setup item;
  query the received input data against completion criteria from the at least one of the first or the second software platforms, wherein the setup item being associated with the at least one of the first or the second platforms and the setup item has a predetermined item type, the predetermined item type being at least one of (i) a critical setup item type associated with a requirement for a determination of verified accuracy for completion of the setup item, and (ii) a non-critical setup item type associated with a requirement for a determination of an adequate indication of accuracy for completion of the setup item, such that:
    in accordance with the setup item having the critical setup item type, the completion criteria comprises reconciling the state of the setup item with corresponding data from the at least one of the first or the second software platforms, wherein the reconciling ascertains that one or more tasks associated with the setup item have been completed; and
    in accordance with the setup item having the non-critical setup item type, the completion criteria comprises comparing the received input data against one or more predetermined user interface actions to be completed, wherein the one or more predetermined user interface actions being determined as completed infers the setup item is confirmed as completed;
  update the state of the setup item in the associated database to a state indicative of the setup item being completed; and
  display, by the communication interface, a visual indication of confirmation of the completion of the setup item.

17. A non-transitory storage medium storing instructions executable by a processing unit to cause the processing unit to:
  receive from a communication interface, input data associated with at least one of a first or a second software platform of an IT Service Management (ITSM) system, wherein the ITSM system comprises the first software platform, the second software platform, and an intermediary onboarding platform operatively associated with a database for storing a state of a setup item;
  query the received input data against completion criteria of the setup item from the at least one of the first or the second software platforms, wherein the setup item being associated with the at least one of the first or the second platforms and the setup item has a predetermined item type, the predetermined item type being at least one of (i) a critical setup item type associated with a requirement for a determination for verified accuracy for completion of the setup item, and (ii) a non-critical setup item type associated with a requirement for a determination of an adequate indication of accuracy for the completion of the setup item, such that:
    in accordance with the setup item having the critical setup item type, the completion criteria comprises reconciling the state of the setup item with corresponding data from the at least one of the first or the second software platforms, wherein the reconciling ascertains that one or more tasks associated with the setup item have been completed; and
    in accordance with the setup item having the non-critical setup item type, the completion criteria comprises comparing the received input data against one or more predetermined user interface actions to be completed, wherein the one or more predetermined user interface actions being determined as completed infers the setup item is confirmed as completed;
  update the state of the setup item in an associated database to a state indicative of the setup item being completed; and
  display, by the communication interface, a visual indication of confirmation of the completion of the setup item.

* * * * *